United States Patent
Chen

(10) Patent No.: US 9,227,557 B2
(45) Date of Patent: Jan. 5, 2016

(54) VEHICLE REARVIEW MIRROR WITH INDICATOR FUNCTION

(71) Applicant: MAXZONE AUTO PARTS CORP., Fontana, CA (US)

(72) Inventor: Chao-Chun Chen, Chang Hua (TW)

(73) Assignee: MAXZONE AUTO PARTS CORP., Fontana, CA (US)

( * ) Notice: Subject to any disclaimer, the term of this patent is extended or adjusted under 35 U.S.C. 154(b) by 0 days.

(21) Appl. No.: 13/781,169

(22) Filed: Feb. 28, 2013

(65) Prior Publication Data

US 2014/0126232 A1 May 8, 2014

(30) Foreign Application Priority Data

Nov. 8, 2012 (TW) .............................. 101221642 U

(51) Int. Cl.
*B60Q 1/26* (2006.01)
*B60R 1/12* (2006.01)

(52) U.S. Cl.
CPC ............ *B60Q 1/2665* (2013.01); *B60R 1/1207* (2013.01)

(58) Field of Classification Search
CPC ...... B60R 1/1207; B60Q 1/26; B60Q 1/2665; B60Q 1/2696
USPC ........................................................ 362/494
See application file for complete search history.

(56) References Cited

U.S. PATENT DOCUMENTS

| | | | |
|---|---|---|---|
| 6,749,325 B2 * | 6/2004 | Bukosky et al. ............... | 362/494 |
| 7,510,311 B2 * | 3/2009 | Romas et al. ................. | 362/494 |
| 7,717,596 B1 * | 5/2010 | Bell ............................... | 362/494 |
| 7,771,062 B2 * | 8/2010 | Kuhn et al. .................... | 359/839 |
| 7,855,755 B2 * | 12/2010 | Weller et al. .................... | 349/11 |
| 7,978,094 B2 * | 7/2011 | Uken et al. ................. | 340/815.4 |
| 2008/0089084 A1 * | 4/2008 | Todd et al. .................... | 362/494 |
| 2009/0040778 A1 * | 2/2009 | Takayanagi et al. .......... | 362/494 |
| 2009/0201690 A1 * | 8/2009 | Boivin et al. ................. | 362/494 |
| 2009/0244740 A1 * | 10/2009 | Takayanagi et al. .......... | 359/839 |
| 2011/0128142 A1 * | 6/2011 | Byun ............................ | 340/475 |
| 2011/0211360 A1 * | 9/2011 | Kuhn et al. .................... | 362/494 |
| 2012/0038965 A1 * | 2/2012 | Uken et al. .................... | 359/265 |

* cited by examiner

*Primary Examiner* — Robert May
*Assistant Examiner* — Bryon T Gyllstrom
(74) *Attorney, Agent, or Firm* — Bacon & Thomas, PLLC

(57) ABSTRACT

A vehicle rearview mirror with indicator function includes a mirror mount, a mirror face mounted in the mirror mount and defining a first light transmissive zone, and an indicator device mounted between the mirror mount and the mirror face and including a reflector defining one or multiple reflecting surfaces and LED substrates and light-emitting devices mounted in the reflector. Each LED substrate defines a mounting face facing toward the reflecting surfaces. The light-emitting devices are mounted at the mounting faces of the LED substrates and kept beyond the first light transmissive zone, and controllable to emit light onto the reflecting surfaces so that the reflecting surfaces reflect the light through the first light transmissive zone toward the outside of the vehicle rearview mirror in a uniformly distributed manner.

12 Claims, 6 Drawing Sheets

US 9,227,557 B2

VEHICLE REARVIEW MIRROR WITH INDICATOR FUNCTION

BACKGROUND OF THE INVENTION

1. Field of the Invention

The present invention relates to vehicle rearview mirrors and more particularly, to a vehicle rearview mirror with indicator function.

2. Description of the Related Art

A vehicle rearview mirror is used to compensate for the driver's blind spots, so that the driver can see the road conditions around the vehicle through the rear view mirror. Some commercial vehicle rearview mirrors have an indicator device built therein for giving a visual directional indication signal, stop indication signal or rear car indication signal for enhancing road traffic safety.

Taiwan utility patent No. M301802 discloses a vehicle exterior rearview mirror, which includes a light-emitting device set between a lens and a mirror frame and controllable to emit light through the lens, giving a visual indication signal. However, subject to this light-emitting device mounting method, the light-emitting device is visible from the outside of the vehicle exterior rearview mirror even when the light-emitting device does no work. Further, the light emitted by the light-emitting device through the lens is not uniformly distributed. An improvement in this regard is necessary.

SUMMARY OF THE INVENTION

The present invention has been accomplished under the circumstances in view. It is the main object of the present invention to provide a vehicle rearview mirror with indicator function, which is controllable to emit a uniform distribution of light, providing a visual indication.

To achieve this and other objects of the present invention, a vehicle rearview mirror comprises a mirror mount, a mirror face mounted in the mirror mount, and an indicator device mounted between the mirror mount and the mirror face. The mirror face defines a first light transmissive zone. The indicator device comprises a reflector, at least one light-emitting device substrate and at least one light-emitting device. The reflector comprises at least one reflecting surface. Each LED substrate comprise a mounting face facing toward the at least one reflecting surface of the reflector. The at least one light-emitting device is mounted in the mounting face of the at least one LED substrate, and adapted to emit light onto the at least one reflecting surface, enabling the at least one reflecting surface to reflect the light through the first light transmissive zone toward the outside of the vehicle rearview mirror.

Because the indication light is reflected by the at least one reflecting surface before passing through the first light transmissive zone, the at least one light-emitting device needs not to emit light directly toward the first light transmissive zone. Therefore, the at least one light-emitting device can be mounted inside the vehicle rearview mirror and kept from sight and away from the first light transmissive zone. Because the light emitted by the at least one light-emitting device is reflected by the at least one reflecting surface, the light patter can be modified. Thus, the light passing through the first light transmissive zone has a uniform brightness, giving accurate visual indication.

DETAILED DESCRIPTION OF THE INVENTION

Figure 1:
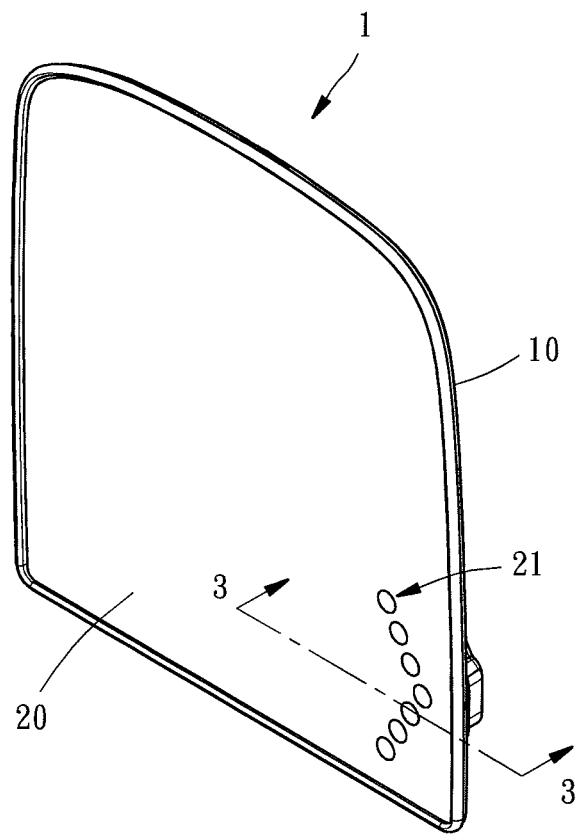
FIG. 1 is an elevational view of a vehicle rearview mirror with indicator function in accordance with a first embodiment of the present invention.
Figure 2:
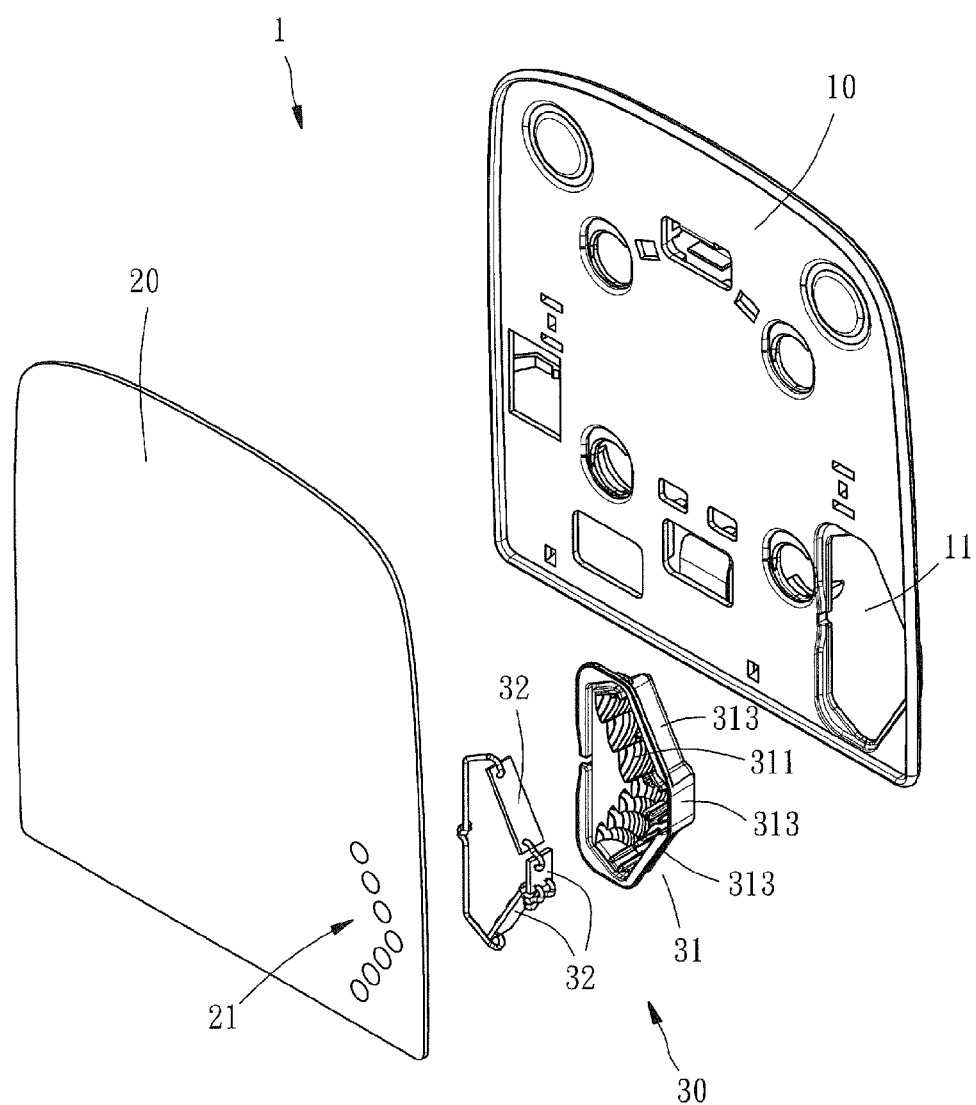
FIG. 2 is an exploded view of the vehicle rearview mirror with indicator function in accordance with the first embodiment of the present invention.
Figure 3:
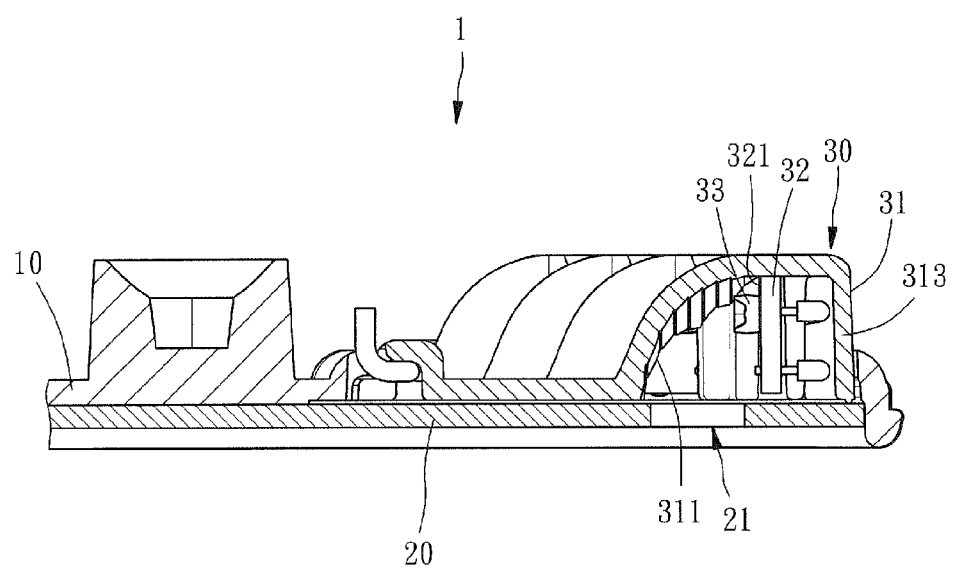
FIG. 3 is a sectional view of the vehicle rearview mirror with indicator function in accordance with the first embodiment of the present invention.

Referring to FIGS. 1-3, a vehicle rearview mirror 1 with indicator function in accordance with a first embodiment of the present invention is shown. The vehicle rearview mirror 1 comprises a mirror mount 10, a mirror face 20, and an indicator device 30. The vehicle rearview mirror 1 can be mounted in a casing (not shown), and then installed in the outside of a motor vehicle by means of the casing.

Figure 4:
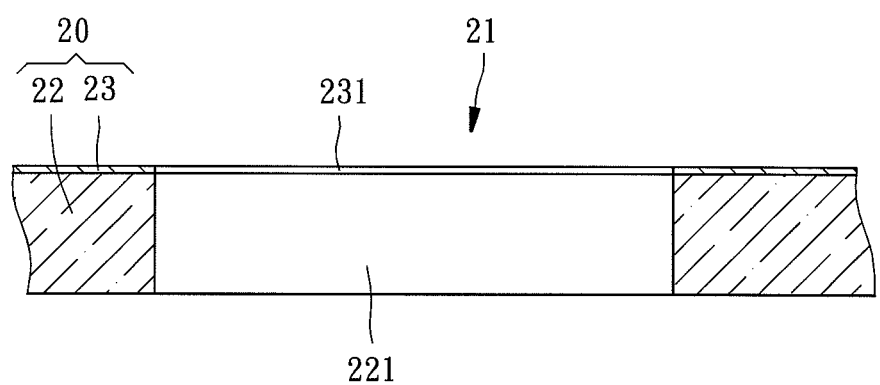
FIG. 4 is a schematic sectional view of a part of the first embodiment of the present invention, illustrating the first light transmissive zone of the mirror face.

The mirror face 20 is mounted in the mirror mount 10, comprising a first light transmissive zone 21. The first light transmissive zone 21 can be configured subject to the signals to be indicated. As illustrated in FIG. 4, the mirror face 20 is made of a light transmissive substrate 22 selected from, for example, glass or acrylic, and having the back (inner) side thereof covered with a coating layer 23. The first light transmissive zone 21 is formed of a plurality of apertures 221,231 that are respectively formed in the light transmissive substrate 22 and the coating layer 23.

The indicator device 30 is mounted between the mirror mount 10 and the mirror face 20, more specifically, the indicator device 30 is mounted in an accommodation chamber 11 in the mirror mount 10. Further, the indicator device 30 comprises a reflector 31, and at least one LED substrate 32 and at least one light-emitting device, for example, LED 33. The number of the at least one LED substrate 32 and the number of the at least one LED 33 are not limited. For example, the number of the at least one LED substrates 32 can be 3, and a plurality of LEDs 33 can be installed in the LED substrate 32.

The reflector 31 defines therein at least one reflecting surface 311. Each reflecting surface 311 corresponds to at least one light-emitting device 33. The LED substrates 32 are mounted in the reflector 31 opposite to the reflecting surfaces 311, each having a mounting face 321 facing toward at least one reflecting surface 311. The LEDs 33 are respectively mounted at the mounting faces 321 of the LED substrates 32 and adapted to emit light toward the reflecting surfaces 311 so that the reflecting surfaces 311 can reflect the light emitted by the LEDs 33 through the first light transmissive zone 21 to the outside of the mirror face 20, giving a visual indication signal to other drivers or passers-by. Also, in some embodiments the reflector 31 further defines a standing portion 313 perpendicular to the mirror face 20 and facing the at least one reflecting surface 311, and the at least one LED substrate 32 is mounted on the standing portion 313.

In this first embodiment, the light emitted by the LEDs 33 is reflected by the reflecting surfaces 311 toward the first light transmissive zone 21. Thus, the reflecting surfaces 311 can be properly configured to reflect light, providing a uniform light field. Further, it is not necessary to keep the light-emitting device 33 aiming at the mirror face 20 accurately. For example, the mounting faces 321 of the LED substrates 32 can be mounted perpendicular to the mirror face 20, keeping the axes of light of the light-emitting devices 33 in parallel to the mirror face 20, minimizing the exposed area of the LEDs 33 beyond the first light transmissive zone 21 and reducing the possibility that a person can see the LEDs 33 from the outside through the mirror face 20.

Figure 5:
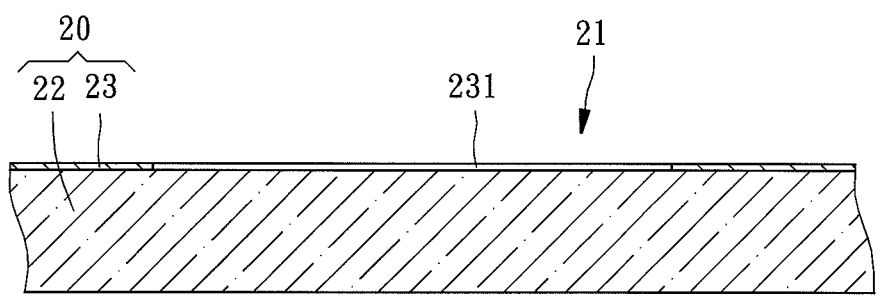
FIG. 5 is a schematic sectional view of a part of a vehicle rearview mirror with indicator function in accordance with a second embodiment of the present invention, illustrating a first light transmissive zone in a mirror face.

In a second embodiment of the present invention, the structure of the mirror face 20 is modified, i.e., the coating layer 23 of the mirror face 20 defines at least one aperture 231, as shown in FIG. 5, through which the light emitted by the LEDs 33 can go from the inside of the mirror face 20 toward the outside.

Figure 6:
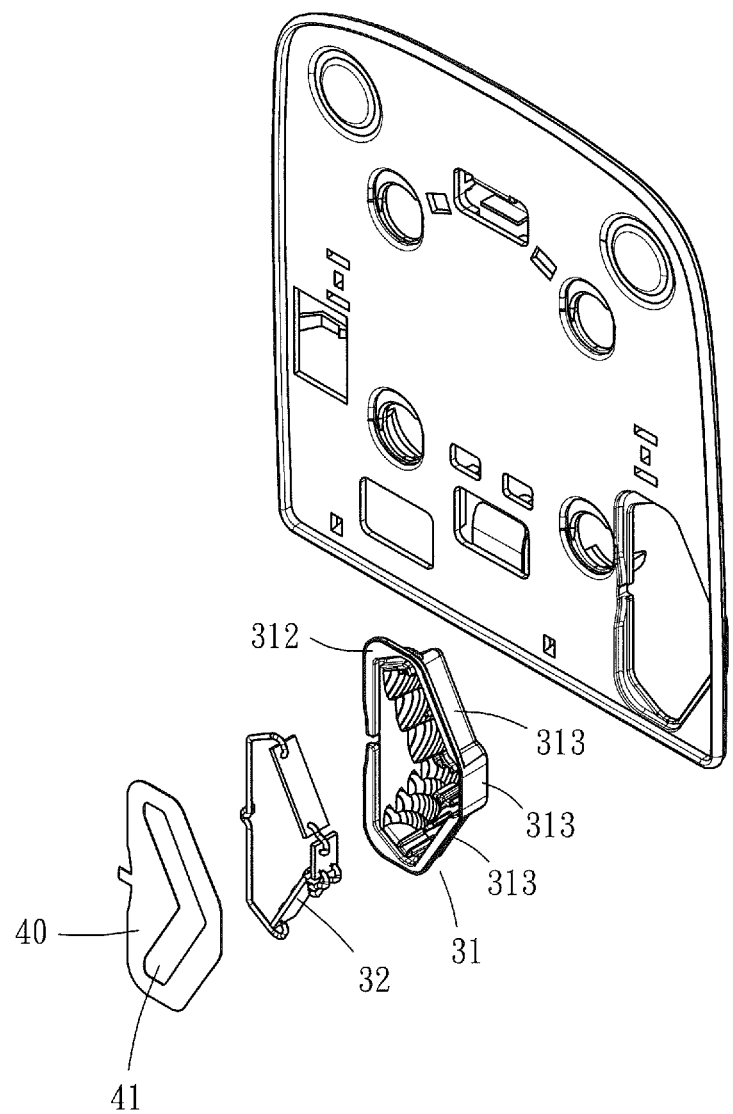
FIG. 6 is an exploded view of a vehicle rearview mirror with indicator function in accordance with a third embodiment of the present invention (the mirror face is not shown).
Figure 7:
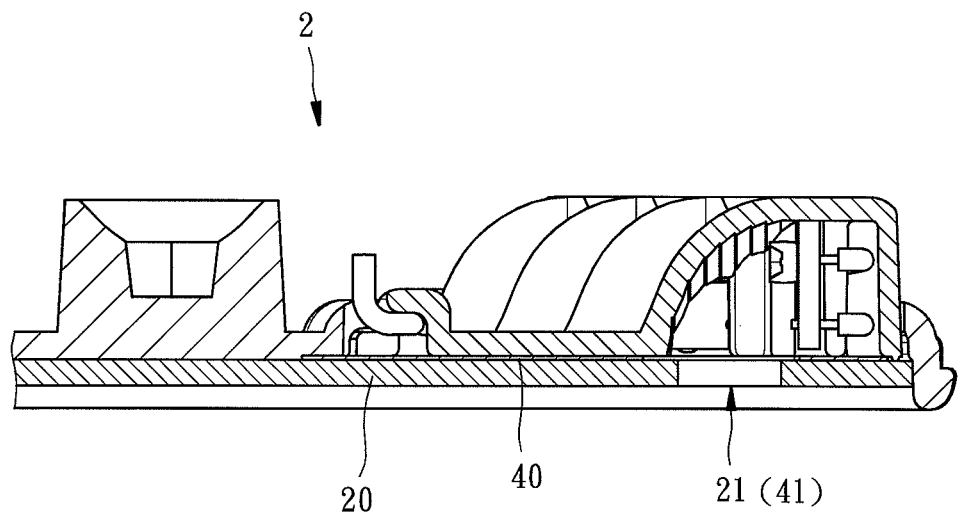
FIG. 7 is a sectional view of the vehicle rearview mirror with indicator function in accordance with the third embodiment of the present invention.

On the other hand, different users may have different preferences for the appearance of the indication signal. If you directly change the shape of the first light transmissive zone 21 of the mirror face 20, the work may be difficult to achieve, or the cost may be excessively high. FIGS. 6 and 7 illustrate a vehicle rearview mirror with indicator function in accordance with a third embodiment of the present invention. According to this third embodiment, the vehicle rearview mirror 2 further comprises a light shield 40 made from plastics or other suitable material. The light shield 40 is mounted on a bonding face 312 of the reflector 31 that faces toward the mirror face 20. The light shield 40 is opaque to light but processed to provide an opening forming a second light transmissive zone 41. The second light transmissive zone 41 has at least a part thereof overlapped on the first light transmissive zone 21. The overlapped area between the second light transmissive zone 41 and the first light transmissive zone 21 defines the shape of the indication signal. Because the installation cost of the light shield 40 is much lower than the mirror face 20, the light shield 40 can easily be processed to provide the second light transmissive zone 41. Therefore, this embodiment can lower the cost of custom design.

It's worth mentioning that the light shield can be designed in an alternate form, comprising a substrate and at least one cover layer, wherein the substrate is made from a transparent or translucent material, for example, plastics or acrylic, having at least one of two opposite sides thereof partially covered with a cover layer so that the other area beyond the cover layer defines the said second light transmissive zone.

Figure 8:
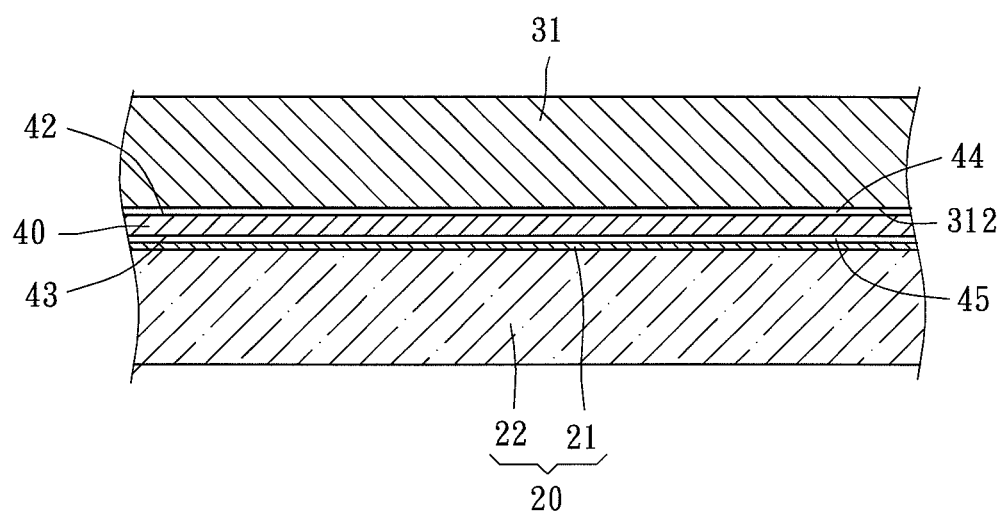
FIG. 8 is a schematic sectional view of a part of the third embodiment of the present invention, illustrating the arrangement of the mirror face, the light shield and the reflector.

As shown in FIG. 8, to facilitate installation of the light shield 40, a first adhesive layer 44 and a second adhesive layer 45 are respectively arranged on opposing first side 42 and second side 43 of the light shield 40, enabling the first side 42 and second side 43 of the light shield 40 to be respectively bonded to the bonding face 312 of the reflector 31 and the mirror face 20 by the first adhesive layer 44 and the second adhesive layer 45. The first adhesive layer 44 and the second adhesive layer 45 are preferably selected from a reusable adhesive material. Further, the first adhesive layer 44 and the second adhesive layer 45 both or one of them can be omitted. Further, the distribution of the first adhesive layer 44 and the second adhesive layer 45 does not overlap with the first light transmissive zone 21 so that any person cannot see the first adhesive layer 44 and the second adhesive layer 45 from the outside of the vehicle rearview mirror, increasing the aesthetic value.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle rearview mirror, comprising:
   a mirror mount;
   a mirror mounted at said mirror mount, said mirror comprising a light transmissive substrate with a coating layer and having a first light transmissive zone formed in said light transmissive substrate and said coating layer; and
   an indicator device mounted between said mirror mount and said mirror, said indicator device comprising a reflector and at least one LED substrate mounted on an inner wall of said reflector, said reflector comprising at least one reflecting surface on said inner wall of said reflector, and a bonding face facing toward said mirror, each said LED substrate comprising a mounting face facing toward said at least one reflecting surface, at least one light-emitting device being mounted at said mounting face of each said LED substrate;
   a light shield comprising a second light transmissive zone partially overlapped on said first light transmissive zone, a first side connected to said bonding face, and a second side connected to said mirror;
   wherein said at least one light-emitting device is oriented to emit peak luminance in a plane substantially parallel to said mirror and toward said at least one reflecting surface; and
   wherein said at least one reflecting surface is adapted to reflect the light emitted by said at least one light-emitting device through said first light transmissive zone toward the outside of the vehicle rearview mirror.

2. The vehicle rearview mirror as claimed in claim 1, wherein said light shield further comprises a first adhesive layer arranged at said first side and bonded to said bonding face to secure said light shield to said reflector.

3. The vehicle rearview mirror as claimed in claim 1, wherein said light shield further comprises a second adhesive layer arranged at said second side and bonded to said mirror to secure said light shield to said mirror.

4. The vehicle rearview mirror as claimed in claim 1, wherein said mirror mount defines therein an accommodation chamber; said indicator device is accommodated in said accommodation chamber of said mirror mount.

5. The vehicle rearview mirror as claimed in claim 1, wherein said reflector further comprises a standing portion intersecting said mirror and facing said at least one reflecting surface, and said at least one LED substrate is mounted on said standing portion.

6. The vehicle rearview mirror as claimed in claim 5, wherein said standing portion is mounted perpendicular to said mirror.

7. A vehicle rearview mirror, comprising:
   a mirror mount;
   a mirror made of a light transmissive substrate with a coating layer and mounted at said mirror mount, said mirror comprising a first light transmissive zone formed in said light transmissive substrate and said coating layer;
   an indicator device mounted between said mirror mount and said mirror, said indicator device comprising a reflector and at least one LED substrate mounted in said reflector, said reflector comprising at least one reflecting surface, and a bonding face facing toward said mirror, each said LED substrate comprising a mounting face facing toward said at least one reflecting surface, at least one light-emitting device being mounted at said mounting face of each said LED substrate;

a light shield comprising a second light transmissive zone partially overlapped on said first light transmissive zone, a first side connected to said bonding face, and a second side connected to said mirror; and wherein said at least one reflecting surface is adapted to reflect the light emitted by said at least one light-emitting device through said first light transmissive zone toward the outside of the vehicle rearview mirror.

8. The vehicle rearview mirror as claimed in claim 7, wherein said light shield further comprises a first adhesive layer arranged at said first side and bonded to said bonding face to secure said light shield to said reflector.

9. The vehicle rearview mirror as claimed in claim 7, wherein said light shield further comprises a second adhesive layer arranged at said second side and bonded to said mirror to secure to said light shield to said mirror.

10. The vehicle rearview mirror as claimed in claim 7, wherein said mirror mount defines therein an accommodation chamber; said indicator device is accommodated in said accommodation chamber of said mirror mount.

11. The vehicle rearview mirror as claimed in claim 7, wherein said reflector further comprises a standing portion intersecting said mirror and facing said at least one reflecting surface, and said at least one LED substrate is mounted on said standing portion.

12. The vehicle rearview mirror as claimed in claim 11, wherein said standing portion is mounted perpendicular to said mirror.

* * * * *